United States Patent [19]

Riza

[11] Patent Number: 5,307,073
[45] Date of Patent: Apr. 26, 1994

[54] OPTICALLY CONTROLLED PHASED ARRAY RADAR

[75] Inventor: Nabeel A. Riza, Clifton Park, N.Y.

[73] Assignee: General Electric Co., Moorestown, N.J.

[21] Appl. No.: 976,019

[22] Filed: Nov. 13, 1992

[51] Int. Cl.$^5$ .................. H01Q 3/22; H04B 10/00; G02F 2/00; G02B 26/06

[52] U.S. Cl. .................. 342/372; 342/368; 359/191; 359/238; 359/578

[58] Field of Search ............... 342/368, 372; 359/191, 359/192, 238, 285, 287, 577, 578, 239, 279; 385/7; 372/20; 331/40

[56] References Cited

U.S. PATENT DOCUMENTS

| | | | |
|---|---|---|---|
| 5,117,239 | 5/1992 | Riza | 342/375 |
| 5,187,487 | 2/1993 | Riza | 342/372 |
| 5,191,339 | 3/1993 | Riza | 342/372 |

OTHER PUBLICATIONS

Riza, Nabeel A., An Acoustooptic Phased Array Antenna Beamformer with Independent Phase and Carrier Control Using Single Sideband Signals, Feb. 1992, IEEE Photonics Technology Letters, vol. 4, No. 2, pp. 177–179.

Day, T. et al., Active Frequency Stabilization of a 1.062-um, Nd:GGG, Diode-Laser-Pumped Nonplanar Ring Oscillator to Less Than 3 Hz of Relative Linewidth, Feb. 15, 1990, Optics Letters, vol. 15, No. 4, pp. 221–223.

Tamburrini, M. et al., Optical Feed for a Phased Array Microwave Antenna, May 11, 1987, pp. 680–681, Electronics Letters, United Kingdom, vol. 23.

Simonis, G. J. et al., Optical Generation, Distribution, and Control of Microwaves Using Laser Heterodyne, May 1990, IEEE Transactions on Microwave Theory and Techniques, vol. 38, No. 5.

Riza, N. A., White Paper, Millimeter Wave Optically Controlled Phased Array Radar, Proposal to Wright Labs, BAA No. 92-05 and U.S. Army CECOM, Space Systems Directorate DAA B07, pursuant to Request for Proposal, submitted as confidential proprietary information (not published), Apr. 15, 1992.

Riza, N. A., Time-Multiplexed Phased-Array Antenna Beam Switching System, Copending patent application Ser. No. 07/826,501, filed 27 Jan. 1992.

Riza, N. A., Optical Time Delay Units for Phased Array Antennas, Ser. No. 07/900,877, filed 18 Jun. 1992.

Riza, N. A., Optical Controller With Independent Two-Dimensional Scanning, Ser. No. 07/955,165, filed 1 Oct. 1992.

*Primary Examiner*—Gregory C. Issing
*Attorney, Agent, or Firm*—W. H. Meise; C. A. Nieves; S. A. Young

[57] ABSTRACT

A compact, stable, and optically efficient two dimensional spatial light modulator-based electro-optical control system for large (>1000 elements) phase-based phased array antennas uses two externally phase-locked lasers to generate respective pluralities of first and second light beams that are respectively mutually orthogonally polarized. Respective ones of the first and second light beams are combined to pass along collinear and coincident paths to form a plurality of combined light beams. The frequency difference between the first and second light beams which form the constituent beams in each combined beam cause an interference pattern that, upon heterodyne detection of the optical signal and conversion to an electrical antenna drive signal, provides control of the carrier frequency for driving the antenna. A phase delay is introduced via electrical control of an array of birefringent-mode nematic liquid crystal pixels that selectively phase delay one of the constituent light beams having a predetermined linear polarization in each combined light beam, while the other constituent beam is not phase delayed and is used as a reference for microwave/millimeter wave signal generation via interferometric detection through a photodiode. Further, a frequency shift unit coupled to the laser assembly enable an intermediate frequency offset to be selectively introduced, such as during receive cycles of the radar, such that electrical output signals generated by the optical signal processing system exhibit a desired intermediate frequency.

40 Claims, 7 Drawing Sheets

5,307,073

OPTICALLY CONTROLLED PHASED ARRAY RADAR

BACKGROUND OF THE INVENTION

This invention relates generally to signal processing systems and more particularly to beamforming controls for phased array antenna systems.

Phased array antenna systems employ a plurality of individual antennas or subarrays of antennas that are separately excited to cumulatively produce a transmitted electromagnetic wave that is highly directional. The radiated energy from each of the individual antenna elements or subarrays is of a different phase, respectively, so that an equiphase beam front, or the cumulative wave front of electromagnetic energy radiating from all of the antenna elements in the array, travels in a selected direction. The differences in phase or timing among the antenna activating signals determines the direction in which the cumulative beam from all of the individual antenna elements is transmitted. Analysis of the phases of return beams of electromagnetic energy detected by the individual antennas in the array similarly allows determination of the direction from which a return beam arrives.

Beamforming, or the adjustment of the relative phase of the actuating signals for the individual antennas (or subarrays of antennas), has been accomplished by electronically shifting the phase of actuating signals or by introducing a time delay in actuating signals for selected antenna elements to sequentially excite the antenna elements to generate the desired direction of beam transmission from the antenna. Opto-electronic processing of beamforming signals for phased array antennas provides superior performance over conventional electronic-only processing by reason of, for example, increased bandwidth, compactness, and high performance signal control. Examples of such opto-electronic systems are disclosed in U.S. Pat. No. 5,117,239 of N. Riza entitled "Reversible Time Delay Beamforming Optical Architecture for Phased-Array Antennas", issued May 26, 1992, and in the following copending applications: Ser. No. 07/826,501, filed Jan. 27, 1992 and entitled "Time-Multiplexed Phased-Array Antenna Beam Switching System"; U.S. Pat. No. 5,191,339 filed Mar. 5, 1992 and entitled "Phased-Array Antenna Controller"; U.S. Pat. No. 5,187,487, filed Mar. 5, 1992 and entitled "A Compact Wide Tunable Bandwidth Phased Array Antenna Controller"; Ser. No. 07/900,877, filed Jun. 18, 1992 and entitled "Optical Time Delay Units for Phased Array Antennas"; and Ser. No. 07/955,165, filed Oct. 1, 1992 and entitled "Optical Controller With Independent Two-Dimensional Scanning", all of which are assigned to the assignee of the present invention and are incorporated herein by reference.

Ideally, a phased array antenna control system should have the ability to generate electromagnetic signals in the microwave to millimeter wavelength range, and should be light, compact, relatively immune to undesirable electromagnetic radiation, and straightforward to fabricate, operate, and maintain. Such a system also desirably has a wide antenna tunable bandwidth, and inertialess, motion-free high resolution beam scanning ability with application-dependent slow-to-fast scanning speeds.

It is additionally advantageous to have an analog beamforming control system that enables a large number of phase shift combinations to be generated and which thus provides enhanced transmit and receive beamforming capabilities. Such an analog system is in contrast to digital phase control from electronic phase shifters; the digital nature of such phase shifters limits the device to a fixed number of possible phase actuation signals. This limited number of possible actuation signals in turn limits the phase resolution achievable with the microwave devices, thus limiting the angular resolution of the scanned antenna beam. Further, in conventional electronically controlled phased array antennas, the digital microwave phase shifters are also typically used for correcting phase errors that result due to other microwave devices in the system. Because of the digital nature of the phase shifters, these phase errors can only be partially cancelled.

An optical control system can also use heterodyne detection between respective phase-shifted light beams in an optical signal pair to generate a scanning interference phase pattern. One example of such a system, using a liquid crystal pixel array for generating phase delays in one light beam of an optical signal pair, is disclosed in copending, commonly assigned, application of N. A. Riza entitled Phased-Array Antenna Controller, Ser. No. 07/847,155, cited above. Another method of generating a scanning pattern based on interference between light beam pairs is described in the article authored by N. Riza entitled "An Acoustooptic Phased Array Antenna Beamformer with Independent Phase and Carrier Control Using Single Sideband Signals", appearing in *IEEE Photonics Technology Letters*, Vol. 4, No. 2, February 1992.

Modulation of the optical signal can also be used to generate the desired electromagnetic transmission frequency, such as by direct modulation of the light source, typically a laser, at the desired frequency. At the high frequencies desired for optimum radar performance, however, such direct modulation techniques on the laser are seriously limited due to transients and harmonics in the laser output energy. Generation of optical interference patterns with two distinct laser beams, with subsequent heterodyne detection of the temporally-varying interference pattern, can be used to generate the desired carrier frequency of the electromagnetic signal transmitted from the antenna, as described in the article by G. Simmons and K. Purchase, "Optical Generation, Distribution, and Control of Microwaves Using Laser Heterodyne", *IEEE Transactions on Microwave Theory and Techniques*, Vol. 38, No. 5, May 1990, pp 667–669. This article notes that phase shifting of a microwave modulation superposed on an optical carrier is not straightforward to implement in a practical fashion, especially when thousands of channels may be involved, each requiring five or more bits of phase shift control. Simmons and Purchase suggest use of a semiconductor superlattice waveguide disposed in the path of one of the lasers or the use of deformable mirror devices, but neither of these devices have been readily fabricated in large scale high performance arrays suitable for radar applications. In particular, sub-micron motion accuracy is required for the deformable mirror devices to implement 0–$2\pi$ phase shift control at the optical wavelength. Such high performance motion accuracy is extremely difficult to achieve, and devices or arrays of this nature have so far not been built. Further, the deformable mirror devices do not provide a substantially inertialess optical phase modulation system.

It is accordingly an object of this invention to provide an opto-electronic signal processor that can generate carrier independent high quality (e.g., 6–8 bit) analog phase-based phased array antenna beam control.

It is a further object of this invention to provide a phase-based antenna controller that is relatively compact, lightweight and has an inertialess beam scanning structure and that can readily be connected to remote antenna sites via fiber optics.

Another object of this invention is to provide a phase-based antenna controller that has a wide (i.e., in a range from DC to several hundred GHz) tunable antenna bandwidth with stable phase-control and an independent, analog, phase-error calibration capability for all the elements in the array.

A further object of the present invention is to provide an optical beam processing technique that has low optical losses, low inter-channel crosstalk, and that is readily fabricated for use with a relatively large (e.g., >1000) number of phased array antenna elements.

A still further object of this invention is to provide a optical controller for a phased array antenna having the ability to rapidly switch between a desired carrier frequency for transmission and a desired intermediate frequency for processing return radar signals.

SUMMARY OF THE INVENTION

In accordance with the present invention, an optical signal processing system for controlling, for example, a phased array antenna system, comprises a laser assembly having first and second lasers that are phase-synchronized, and means for controlling a frequency difference between the respective pluralities of first and second light beams generated; means for combining along a plurality of collinear paths respective ones of the first and second light beams, in each combined beam the first and second light beams being superposed on one another and respectively orthogonally linearly polarized; at least one optical phase modulator, such as a spatial light modulator (SLM), coupled to the combining means; and a heterodyne detection device to convert the optical signals into electrical signals. The frequency difference between the first and second light beam in each combined beam generates a temporally varying interference pattern that, when detected by the heterodyne detection device, controls the carrier frequency of the electrical signals generated by the processing system and phase shifts introduced into selected ones of the beams by the spatial light modulator control beamforming for the antenna array.

The frequency difference between the light beams generated by the first and second lasers is controlled by an external tuning device coupled between the two lasers to synchronize the phase and selectively control the frequency of at least one of the lasers. Typical external tuning devices for coupling lasers include devices for thermal tuning or piezoelectric tuning of the laser. The spatial light modulator comprises an array of individually controllable liquid crystal pixels and is disposed so that the phase of one of the constituent beams having a predetermined polarization can be selectively changed dependent on the control voltage applied to the pixel. Thus, in each combined light beam, one of the constituent light beams has a phase shift that is preserved as the microwave signal phase shift and is used on heterodyne detection of the two beams to generate an electrical beamforming signal.

The combining means typically comprises a polarizing beam splitter (PBS) disposed to receive the pluralities of first and second light beams along respective first and second mutually orthogonal input axes such that substantially all of the first and second laser light beams pass as combined light beams from the PBS along substantially collinear paths. A beam expander is coupled to the PBS and a 45° polarizer is coupled to the SLM prior to the beams being coupled into a fiber array arranged in a pattern corresponding to the pixel array in the SLM. At the end of each optical fiber is a photodiode that provides heterodyne detection of the first and second light beams and the respective phase-shifted light beams, and generates a corresponding electrical microwave or millimeter wave beamforming signal. A photodiode array is typically electrically coupled through transmit/receive circuitry to control the electromagnetic radiation pattern in the transmit and receive modes of a plurality of antenna elements in a phased array antenna.

The optical signal processing system is further adapted to shift the frequency of the electrical signals generated by the processed optical beams, for example to produce a different beam processing system output frequency for antenna transmit and receive cycles. A frequency shift unit coupled to one of the lasers typically comprises an acousto-optic device (AOD) disposed to receive light from the laser and be driven at a desired frequency, for example an intermediate frequency in comparison with the carrier frequency. Light beams passing through the AOD are deflected and doppler shifted by an amount corresponding to the drive frequency of the AOD; the deflected light beams are directed via an optical architecture including mirrors, polarization rotation switches, and polarizing beam splitters back onto the path along which they pass into the beam combining means such that the combined beams now further exhibit a frequency deflection corresponding to the desired intermediate frequency. On mixing in the transceiver module, the signals exhibit the desired intermediate frequency.

BRIEF DESCRIPTION OF THE DRAWINGS

The features of the invention believed to be novel are set forth in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
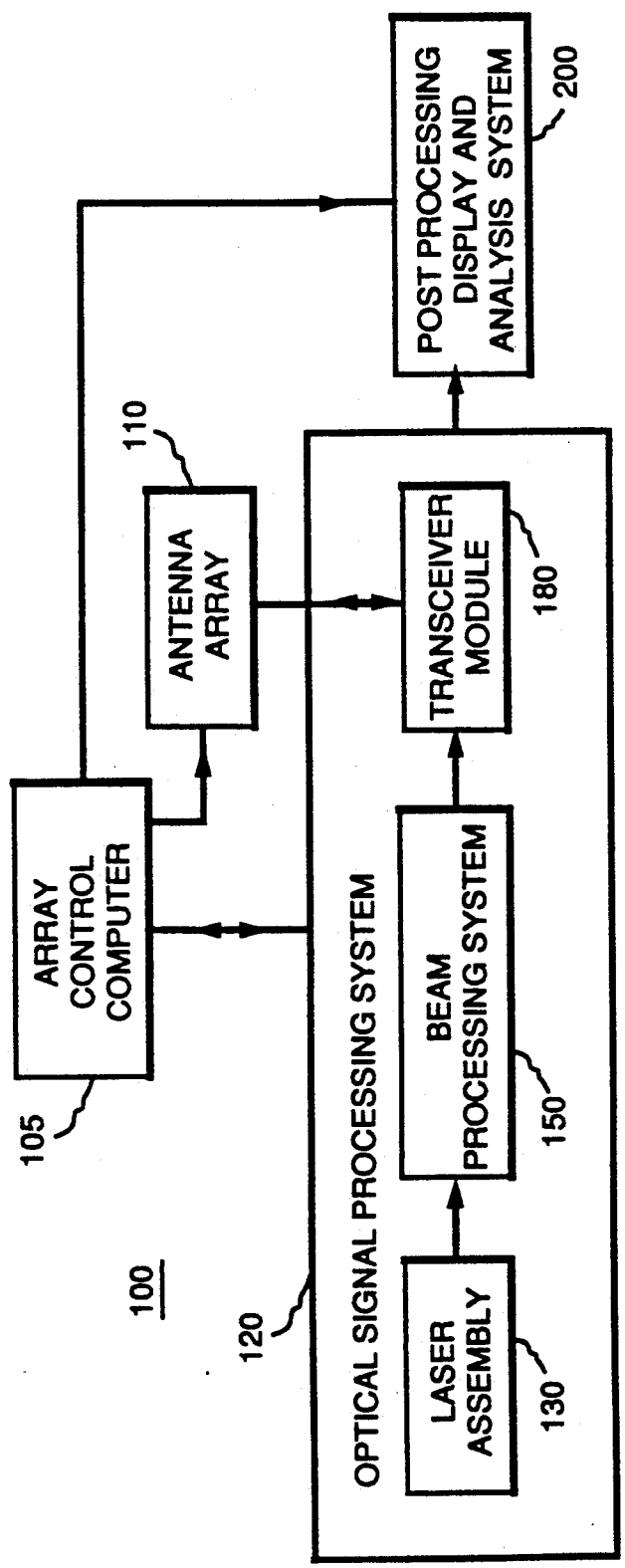
FIG. 1 is a block diagram of a phased array antenna system in which the present invention is employed.

In FIG. 1, a phased array antenna system 100 as used in a radar system or the like is shown comprising an array control computer 105, an antenna array 110, an optical signal processing system 120, and a post-processing display and analysis system 200. Optical signal processing system 120 comprises a laser assembly 130, a beam processing system 150 for acting upon the laser beam produced by laser assembly 130, and a transceiver module 180 responsive to the optical signals received from beam processing system 150. Array control computer 105 is coupled to and generates signals to control and synchronize the operation, described below, of the components listed above so that optical signal processing system 120 controls the carrier frequency of the electromagnetic radiation and the transmit and receive radiation patterns of the antenna array.

Figure 2:
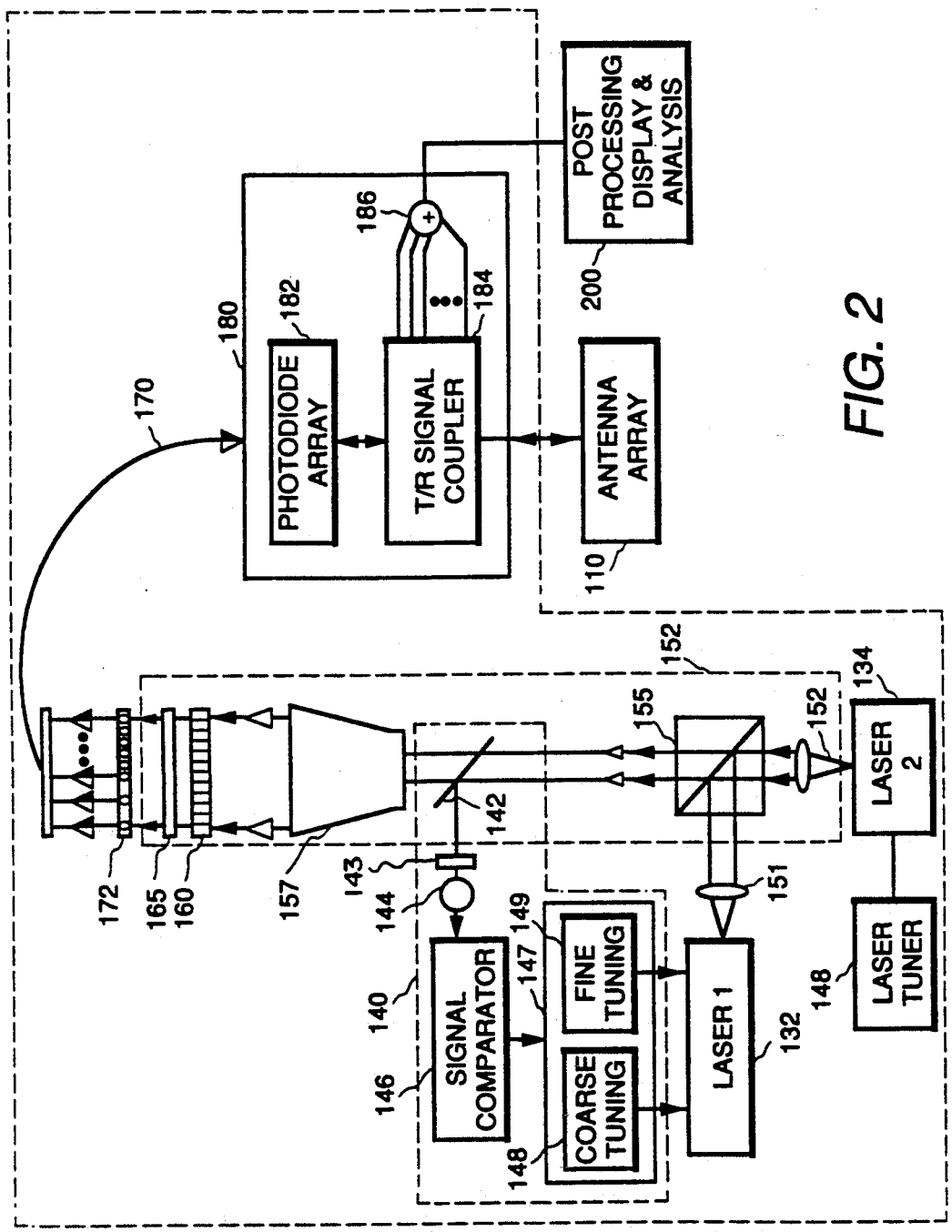
FIG. 2 is a part block and part schematic representation of a phased array antenna system illustrating one embodiment of the present invention.

FIG. 2 illustrates in greater detail certain components of phased array antenna system 100 of FIG. 1 in accordance with one embodiment of the present invention. When the system operates in the transmit mode, electromagnetic energy is radiated into free space by antenna array 110, which typically comprises a plurality of antenna elements (not shown). As used herein, an antenna element may comprise one or more radiating devices (not shown) which, when excited by an electrical signal, radiates electromagnetic energy into free space. In a phased array system, the number and arrangement of the antenna elements are determined by the desired beamforming and detection capabilities for the array. For example, in a typical advanced phased array radar system for target tracking, each face of a four-faced array comprises about 1,000 antenna elements.

Antenna array 110 is coupled to signal processing system 120 via a transceiver module 180, and a transmit fiber optic array link 170. Transceiver module 180 is controlled by array control computer 105 (shown in FIG. 1) to select a transmit or a receive mode of operation of phased array antenna system 100. In the transmit mode, optical signals from signal processing system 150 are converted to electrical beamforming signals in transceiver module 180, which signals are used to drive the antenna elements to radiate electromagnetic energy into free space. In the receive mode, transceiver module 180 mixes return electrical signals corresponding to the electromagnetic energy detected by the antenna elements with the electrical signals derived from signal processing system 150 and, after electronic low pass/IF filtering, generates in-phase signals to be added and then processed by post processing system 200 for display and analysis.

As illustrated in FIG. 2, optical signal processing system 120 comprises optical architecture to generate phase shifts in drive signals for antenna array 110. As used herein, "optical architecture" refers to the combination of devices for manipulating the direction, diffraction, polarization, or the phase or amplitude of the light beams.

Laser assembly 130 (FIG. 1) comprises first and second lasers 132, 134 (FIG. 2) which are coupled to components of optical signal processing system 120. Each laser comprises a semiconductor laser or the like that can provide beam intensities and spectral purity sufficient for operation of the optical signal processing system as described in this application. First and second lasers 132, 134 each preferably generate respective linearly polarized coherent light beams to provide an input signal to the optical architecture of signal processing system 120. It is further preferable that first laser 132 generate light beams having a linear polarization (e.g., p-polarized) that is orthogonal to the linear polarization of second laser 134 (per this example, s-polarized). The particular polarization orientation of light generated by a given one of the lasers is a matter of design choice as the optical architecture can be adapted to accommodate either choice. Alternately, if first and second lasers generate light having the same linear polarization, a polarization shifter (not shown) is coupled to one of the lasers to provide the desired respectively orthogonally polarized output light beams from laser assembly 130. One laser, first laser 132 illustrated in FIG. 2, is coupled as a slave to a reference laser, e.g., second laser 134 illustrated in FIG. 2, by an external locking device 140. Typically, the individual frequencies of the two lasers can be independently tuned by thermal tuning over a broad frequency range; the slave laser is typically phase locked to the reference laser via narrowband piezoelectric device tuning.(PZT).

External locking device 140 is adapted to synchronize the phase and to selectively generate a frequency difference in a predetermined range between light beams generated by first and second lasers 132, 134. One embodiment of external locking device 140 is illustrated in FIG. 2 and comprises means for sampling the reference and slaved laser beams, comparing the beams, and controlling the slaved laser to generate an optical frequency or color shift to provide the desired carrier frequency for the transmitted electromagnetic energy from the antenna array. External locking device 140 comprises a non-polarizing beam splitter 142, a 45° polarizer 143, an optical detector 144, a signal comparator 146, and a laser tuner 147. Beamsplitter 142 is disposed in the optical architecture so that collinear light beams from first and second lasers 132, 134 are incident on it such that a small portion of the combined collinear beams is deflected into optical detector 144, which typically comprises a photodetector such as a photodiode or the like. The light beams pass through 45° polarizer 143 that combines the in-line components of the two beams before the beams are incident on detector 144, which causes it to generate an electrical signal that has a frequency corresponding to the difference in optical frequencies between the light beams from the first and second lasers. Detector 144 is coupled to signal comparator 146 such that the sampled signal is compared to a desired frequency.

Signal comparator 146 is coupled to laser tuner 147 such that a desired adjustment in the frequency detected by detector 144 can be changed by tuning the slaved laser to a frequency so that the light beams emanating from first laser 132, when mixed with the light beams emanating from second laser 134 operating at a fixed reference frequency, generate an interference signal to produce the desired carrier frequency. Laser tuner 147 for slave laser 132 advantageously comprises a coarse tuner 148 and a fine tuner 149, each of which are coupled to signal comparator 146 and to laser 132. Coarse tuner 148 typically comprises a thermal frequency tuning device and fine tuner 149 typically comprises a PZT tuning device. Another thermal frequency tuner 148 is advantageously coupled to second (master) laser 134; this arrangement enable both lasers to modulated to produce broad range tuning for a variety of carrier frequencies. Additionally, for example, the slave laser can use PZT actuator-based tuner 149 to provide the phase-locked loop fast, narrow band tuning to generate a stable electrical output after heterodyne detection of the combined light beams passing from beam processing system 150.

In accordance with the present invention, first and second lasers 132, 134 are coupled to beam processing system 150 in which orthogonally linearly polarized light beams from the respective lasers are combined along collinear paths and coupled to an optical phase modulating device 160 and fiber optic array link 170. As illustrated in FIG. 2, beam processing system 150 further comprises first and second collimating lenses 151, 152, a polarizing beam splitter (PBS) 155, and a beam expander 157. First collimating lens 151 is coupled to receive the light beams emanating from first laser 132 and deflect the light into a plurality of collinear first light beams. Similarly, second collimating lens 152 is coupled to second laser 134 such that a plurality of collinear second light beams emanate therefrom.

First and second collimating lenses 151, 152 are optically coupled such that the pluralities of first and second light beams are incident on PBS 155 along respective first and second input axes of the PBS. The light beams emanating from first laser 132 have a selected linear polarization, e.g., p-polarization, which is orthogonal to the linear polarization of the light beams emanating from second laser 134, e.g., s-polarized light. For ease of explaining the invention, light beams having one polarization are illustrated with representative lines having arrowheads that are blank within the outlines of the arrowhead, and light beams having the opposite linear polarization are illustrated along representative lines having arrowheads darkened within the arrowhead boundaries. Where the first and second light beams are collinear, both types of arrowheads are shown. PBS 155 is disposed so that light beams having the polarization orientation of the light beams passing from first laser 132 are deflected substantially at right angles to pass towards beam expander 157. Light beams having the polarization orientation of the light beams passing from second laser 134 enter PBS 155 along the second input axis and pass through substantially undeflected, so that these second light beams also pass towards beam expander 157.

PBS 155 is further disposed so that respective ones of the first light beams and the second light beams emerge from PBS 155 along substantially collinear and coincident paths as a combined beam. Thus, at the face of PBS 155 from which the beams emerge, each combined beam comprises a constituent first light beam and a second light beam, which are still respectively mutually orthogonally polarized (illustrated in FIG. 2 with both open and filled-in arrowheads). PBS 155 is optically coupled to beam expander 157, which is selected to expand the spatial distribution of the combined light beams sufficiently to couple the beams to optical modulation device 160 and fiber optic array 170.

Optical phase modulation device 160 typically comprises a spatial light modulator (SLM) having a two-dimensional (2-D) array of liquid crystal pixels. Each liquid crystal pixel advantageously comprises a nematic liquid crystal cell that is individually controllable. The liquid crystal in the pixel is typically a parallel rub nematic liquid crystal. By way of example and not limitation, the nematic director in each LC pixel is aligned along the "p", that is the vertical direction. Thus, a change in the control voltage applied to a LC pixel affects the index of refraction along the p-direction, causing phase modulation of p-polarized signal light beams passing through respective ones of the pixels. Light having the opposite, or "s", polarization passes through the pixel substantially unaltered regardless of the changing pixel voltage. Thus, the phase of one of the constituent beams (in this example, the p-polarized beam) in each combined beam (of first and second light beams) can be selectively altered without altering the phase of the other constituent light beam. The 2-D arrangement of the pixel array in SLM 160 corresponds to the 2-D arrangement of antenna array 110 so that a separate selectively phase-delayed signal light beam in a respective combined beam can be generated for each antenna element in the antenna array to be individually controlled. Array control computer 105 (FIG. 1) is coupled to SLM 160 to selectively control the individual pixels.

SLM 160 is optically coupled to a beam combining polarizer 165, such as a sheet polarizer or bulk optics polarizer, that is oriented at 45° to the p- and s-polarization directions. This orientation of polarizer 165 enables parallel components from the p-and s-polarized constituent beams to be combined. In FIG. 2 the now uniformly polarized combined beams are illustrated by the half-blank/half-filled arrowheads on the illustrative beam paths.

Polarizer 165 is optically coupled to fiber optic array 170 through a two-dimensional input port coupling device 172 corresponding to the pixel array of SLM 160. The respective fibers in optic array link 170 are coupled between input port coupling device 172 and transceiver module 180 so as to carry the optical signals therebetween. In accordance with this invention, fiber optic array 170 enables transceiver module 180 to be situated at a location remote from beam processing system 120.

In accordance with this invention, transceiver module 180 comprises a heterodyne detection system for the optical signals, for example a photodiode array 182, and further comprises a transmit/receive signal coupler array 184 and an electronic signal adder 186. These components are advantageously fabricated as a monolithic microwave/millimeter wave integrated circuits (MMICs). Each fiber in fiber optic array link 170 is terminated in a respective photodiode in array 182. Each photodiode detects the interference between respective ones of the first and second light beams in each combined beam resulting from the differential phase shift introduced by SLM 160 and generates a corresponding electrical beamforming signal. Further, the heterodyne detection of the combined beams causes the electrical beamforming signals generated by the photodiodes to have a frequency (i.e., the carrier frequency of the electromagnetic radiation emitted from the antenna) that is a function of the frequency difference between first and second lasers 132, 134.

Photodiode array 182 is electrically coupled to transmit/receive coupler array 184, which couples the beamforming signals to the antenna array in the transmit mode and combines the detected return signals received from the antenna array in the receive mode with the desired beamforming signal to generate in-phase signals from each of the antenna elements to be added by signal adder 186 in the receive mode.

Figure 3:
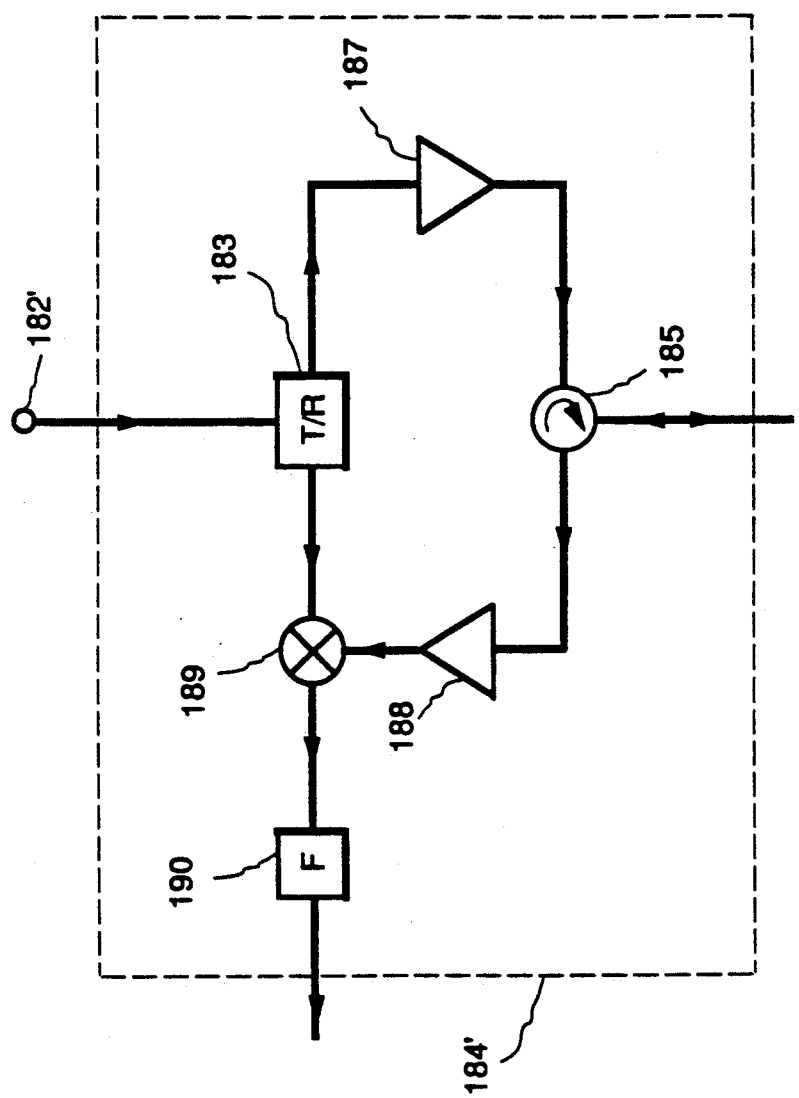
FIG. 3 is a block diagram schematic representation of a transceiver module in accordance with the present invention.

Transmit/receive (T/R) coupler array 184 comprises a plurality of channels to process signals for the respective antenna elements or subassemblies of elements. A representative channel 184' (for controlling one antenna element or subassembly of elements) of coupler 184 is illustrated in FIG. 3. Transmit/receive (T/R) coupler channel 184' comprises a T/R switch 183, a circulator 185, solid state amplifiers 187, 188, a mixer 189, and a filter 190. A photodiode 182' in photodiode array 182 (FIG. 2) is electrically coupled to T/R switch array 183, which is controlled to selectively connect the electrical beamforming signal from photodiode 182' to either power amplifier 187 (in the transmit (T) mode) or to mixer 189 (in the receive (R) mode). In the transmit mode, the electrical beamforming signal is amplified in amplifier 187 and directed to the controlled antenna element (not shown) via circulator 185.

In the receive mode, the phased array antenna system is used to "view" a particular angle of space with respect to the antenna array to determine the intensity of electromagnetic radiation of the desired frequency being received from that direction. In a radar system, for example, the strength or intensity of the radiation received from a given angle determines whether a target is detected in that direction. The differential phase between constituent beams generated by SLM 160 (FIG. 2) in the beam processor determines the beam angle of the phased array antenna in either a transmit or a receive mode. Thus, in the receive mode, and with reference to FIG. 3, the return signals detected in the antenna elements are directed through circulator 185 to low noise amplifier 188, and are mixed in mixer 189 with the reference electrical beamforming signal from photodiode 182'. This reference signal replicates the transmit control signal for each antenna element. Thus, on mixing the receive and reference signals in mixer 189, and implementing low pass electronic filtering, the phase shifts in the signal cancel out, and in-phase baseband signals across the array indicating the presence or absence of a return pulse at the selected angle with respect to the antenna are generated. Alternatively, IF (intermediate frequency) signals can be generated for this in-phase processing across the array to reduce 1/f (inverse frequency) noise in the electrical processing. Mixer 189 is coupled to electronic lowpass filter 190 (or IF filter if IF are signals used), through which the in-phase baseband/IF signal passes enroute to electronic adder 186 (FIG. 2). These in-phase baseband/IF signals generated from the detected signals supplied by the antenna elements are added in microwave adder 186 to maximize the signal-to-noise ratio.

In operation and with reference to FIG. 2, first and second lasers 132, 134 generate respective light beams which are collimated to form pluralities of first and second light beams. The lasers are phase synchronized (or locked) and coupled so that the frequency difference between respective light beams generated by each laser can be controlled within a selected range; this frequency difference is used to produce the interference signals between the first and second light beams that, upon heterodyne detection, result in a desired beat frequency and cause the optical detectors to generate electrical beamforming signals to drive antenna assembly 110 at the desired carrier frequency. The pluralities of first and second light beams are further respectively orthogonally linearly polarized.

The respective pluralities of the first and second light beams are combined in PBS 155 so that respective ones of the first and second light beams pass from the PBS along collinear and coincident paths as combined light beams. The phase of one of the constituent light beams having a predetermined polarization in each combined light beam pair is then modulated in SLM 160; the amount of the phase shift is dependent on the control voltage applied to the respective pixel in the SLM and through which the combined light beam passes. The constituent light beams in each combined light beam emanating from respective pixels in SLM 160 is then uniformly polarized by passing through 45° polarizer 165, which is in turn coupled to fiber optic array link 170. The combined light beam passing from each pixel in SLM 170 passes into a separate fiber in array link 170.

Fiber optic array link 170 couples the combined beams to transceiver module 180 in which the combined beams are detected by a heterodyne detection device, typically an array of photodetectors, which convert the optical signals passing from beam processing system 150 into electrical signals to drive antenna array 110. The interference caused by the frequency difference between the first and second light beams is used to control the carrier frequency of the electromagnetic energy emitted from the array, with the carrier frequency being adjustable by changing the frequency of the slave laser so as to generate a desired frequency difference between the frequency of the output of the reference and the slave lasers. The interference patterns resulting from the modulation of the phase of one of the constituent light beams in the SLM is used to control beamforming in the 2-D antenna array, that is, controlling the spatial focus (such as azimuth and elevation) of the emitted radiation and the area viewed for return signals.

As noted above, it is advantageous for electrical signal processing reasons to generate IF output electrical signals from transceiver module 180. In order to generate IF signals for "receive" signal processing, the optical system preferably generates IF offset signals. This IF offset can be introduced by changing the optical frequency of the first beam from laser 132 (e.g., using the fine tuner in laser tuner 147), although the magnitude of change in frequency required is such that a relatively long time period may be necessary to adjust the frequency, which, in short-range radars with short dwell times between respective transmit-receive sequences, can result in the time to tune the laser constituting a significant portion of the dwell time, a situation undesirable in radar operation.

Figure 6A:
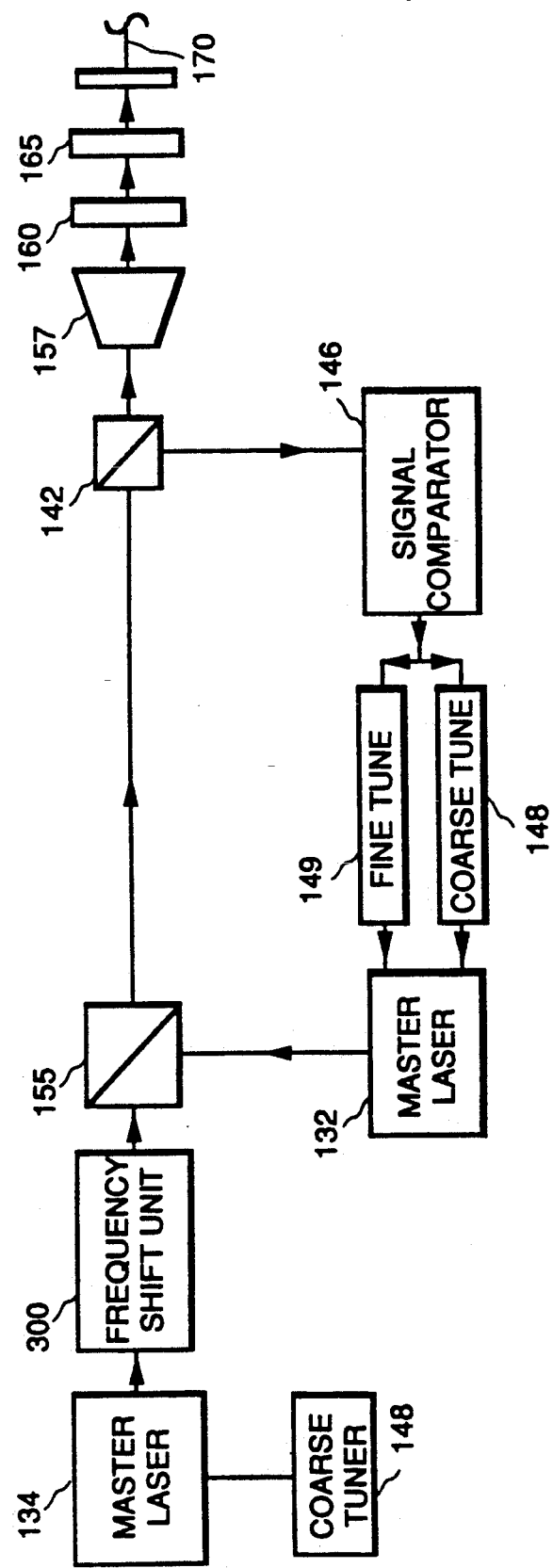
FIG. 6(a) is a block diagram of a portion of a phased array antenna system in accordance with another embodiment of the present invention.
Figure 6B:
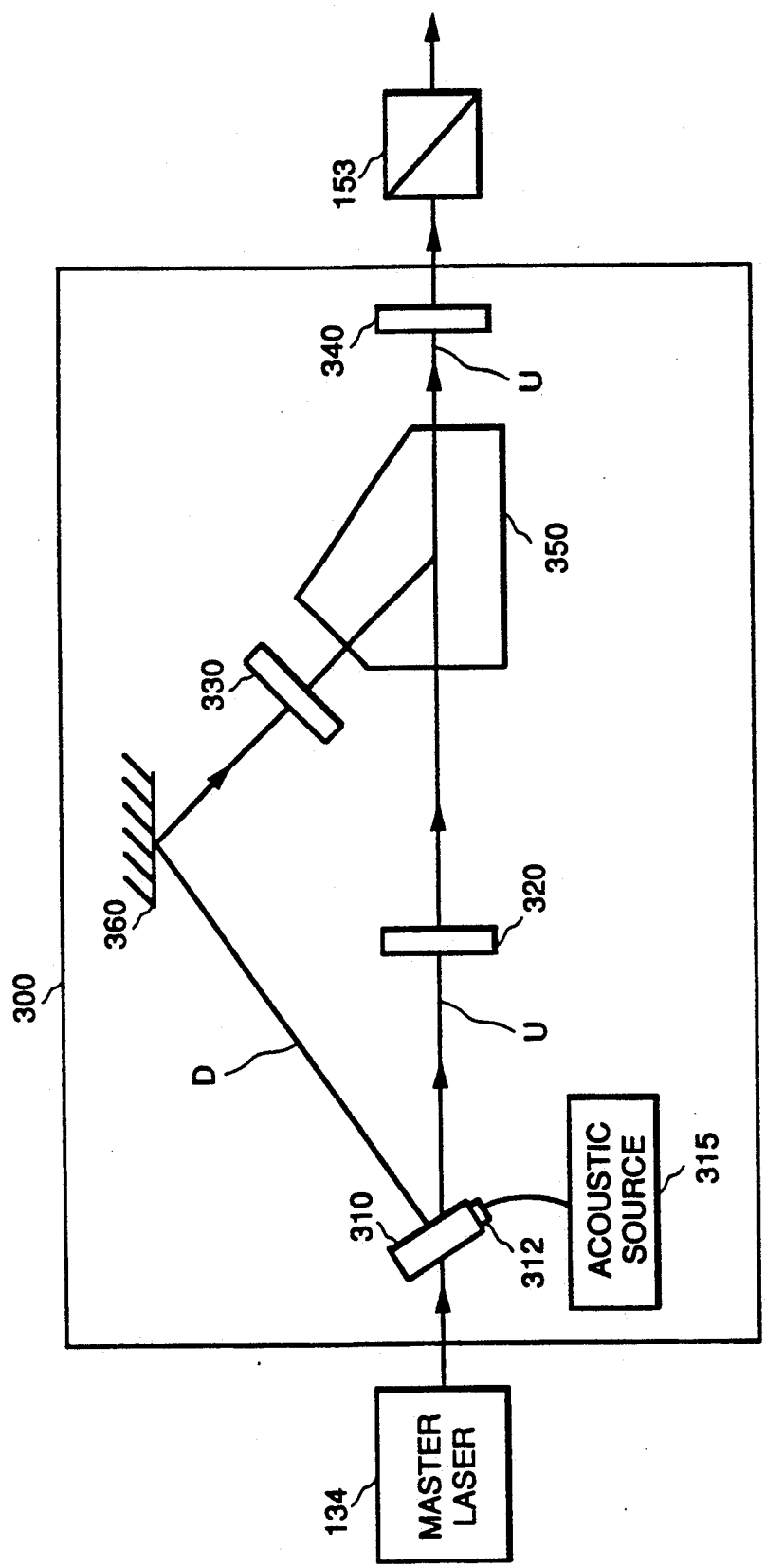
FIG. 6(b) is a schematic diagram of a frequency shift unit in accordance with this invention.

Alternatively, in accordance with this invention, a relatively fast IF offset can be obtained with acousto-optic devices (e.g., Bragg cells), which can generate a selected doppler frequency shift in either beam 1 or beam 2, or both beams with opposite frequency shifts, to produce the desired IF shift in the signals generated by the optical beam processing system. One example of such a system is illustrated in FIGS. 6(a) and 6(b); in FIG. 6(a) an optical signal processing system similar to that shown in FIG. 2 is depicted with a frequency shift unit 300 coupled to master laser 134. For ease of discussion, the frequency shift unit is described in the context of FIG. 6(a), however, in accordance with this invention, frequency shift unit 300 is readily adapted to each of the alternative optical signal processing systems discussed herein.

As illustrated in FIG. 6(a), frequency shift unit 300 is coupled to master laser 134; alternatively, frequency shift unit can be coupled to slave laser 132, or a separate unit 300 coupled respectively to each laser 132, 134. As shown in FIG. 6(b), each frequency shift unit 300 comprises an AOD 310 disposed to receive light beams emanating from master laser 134 and further coupled to be driven via a transducer 312 by an acoustic source 315 at a selected drive frequency. The selected drive frequency corresponds to the desired intermediate frequency ($v_{IF}$). Transducer 312 is disposed on one end of the AOD; the orientation of the AOD with respect to the laser to which it is coupled and the positioning of transducer 312 on the AOD determine whether the light beams passing through the transducer undergo a positive or a negative doppler shift.

Light beams incident on AOD 310 pass directly (that is, substantially undeflected) therethrough along an undeflected path "U", as shown in FIG. 6(b), when AOD is not being driven by transducer 312. When transducer 312 is driving AOD 310, a portion of the light beams incident on the AOD undergo a doppler frequency shift and are deflected onto deflected path "D", as marked in FIG. 6(b), and the remaining portion pass through AOD 310 along undeflected path "U". AOD 310 is optically coupled to a mirror 360, which in turn is optically coupled via a polarization rotation switch (PRS) 330 to a PBS 350; AOD 310 is also optically coupled to a PRS 320 and thence to PBS 350. Each polarization rotation switch comprises a bulk electro-optic switch or a ferro-electric liquid crystal, or the like. PBS 350 is optically coupled to PBS 155 via a PRS 340; PBS 350 may comprise a Thompson PBS, as illustrated in FIG. 6(b), or a cube PBS. Dependent on the type of PBS used, mirror 360 and PRS 330 are disposed such that light beams passing from these components are incident on PBS 350 along a deflection axis that will cause the beams to be directed onto the desired path, as described more fully below, when exiting the PBS, regardless of the type of PBS used. In an alternative arrangement, if AOD 310 is not polarization sensitive, one PRS disposed in the optical architecture before the AOD (i.e., the light beams pass through it before entering the AOD) can be used in lieu of PRS 320 and PRS 330.

In operation, frequency shift unit 300 enables optical signal processing system 100 to rapidly shift between electrical outputs from transceiver 180 having the desired carrier frequency to drive the antenna array in the transmit mode to having an IF frequency output appropriate for electrical processing of return signals detected by the antenna array. In the transmit mode, light beams pass from master laser 134 pass through frequency shift unit 300 unchanged; specifically, AOD 310 is off (that is, not being driven) and light beams pass through it undeflected. PRS 320 and PRS 340 are set to not cause polarization rotation in the transmit mode. Light of the selected polarization emanating from laser 134 thus passes undeflected and sequentially through AOD 310, PRS 320, PBS 350, and PRS 340 out of frequency shift unit 300 and into PBS 155.

When an IF frequency shift is desired, for example in the receive cycle, AOD 310 is driven at the desired IF frequency by drive source 315. Light beams passing therethrough are deflected along path "D" and have a doppler-shifted frequency of $v_{IF}+v$ (in which $v_{IF}$ is the desired intermediate offset frequency and $v$ is the laser frequency). Light beams passing along deflected path "D" are deflected by mirror 360 into PRS 330, in which the linear polarization of the beams is shifted 90° and coupled to PBS350 in which the beams are deflected onto path "U", that is, the same path on which undeflected beams pass from frequency shift unit 300. PRS 340 is selected to cause the linear polarization of light beams passing therethrough to be shifted by 90°; thus the doppler-shifted light beams passing from frequency shift unit 300 have the same polarization as non-doppler shifted light beams passing therefrom and the beams pass from frequency shift unit 300 along path "U" into PBS 155.

When frequency shift unit 300 is activated, PRS 320 is further set to cause a 90° rotation in the linear polarization of light beams passing therethrough such that undeflected light beams passing through AOD 310 (when AOD 310 is being driven) emerge from AOD 310 having a polarization such that they are deflected in PBS 350 off of path "U" and into a light absorber 370; thus, in the receive mode when frequency shift unit 300 is activated, only doppler-shifted light beams pass from frequency shift unit 300 along path "U". Further, the mixing of doppler-shifted light beams from master laser 134 with light beams from slave laser 132 having frequency $v+\Delta v$ allows the output signal to have a frequency corresponding to $v_{IF}$ and $\Delta v$. In a millimeter wave band radar, having, for example, a carrier frequency of 30 GHz or higher, the appropriate IF frequency may be in the range of about 1 GHz. A microwave radar, having a carrier frequency, for example, of about 4 GHz, may have an appropriate IF of about 60 MHz. The AOD enables switching times of approximately hundreds of nanoseconds whereas piezoelectric tuning of the laser requires approximately several tens of microseconds. The AOD thus enables switching times to be a small portion (e.g., 1% or less) of the dwell time of the radar.

Figure 4:
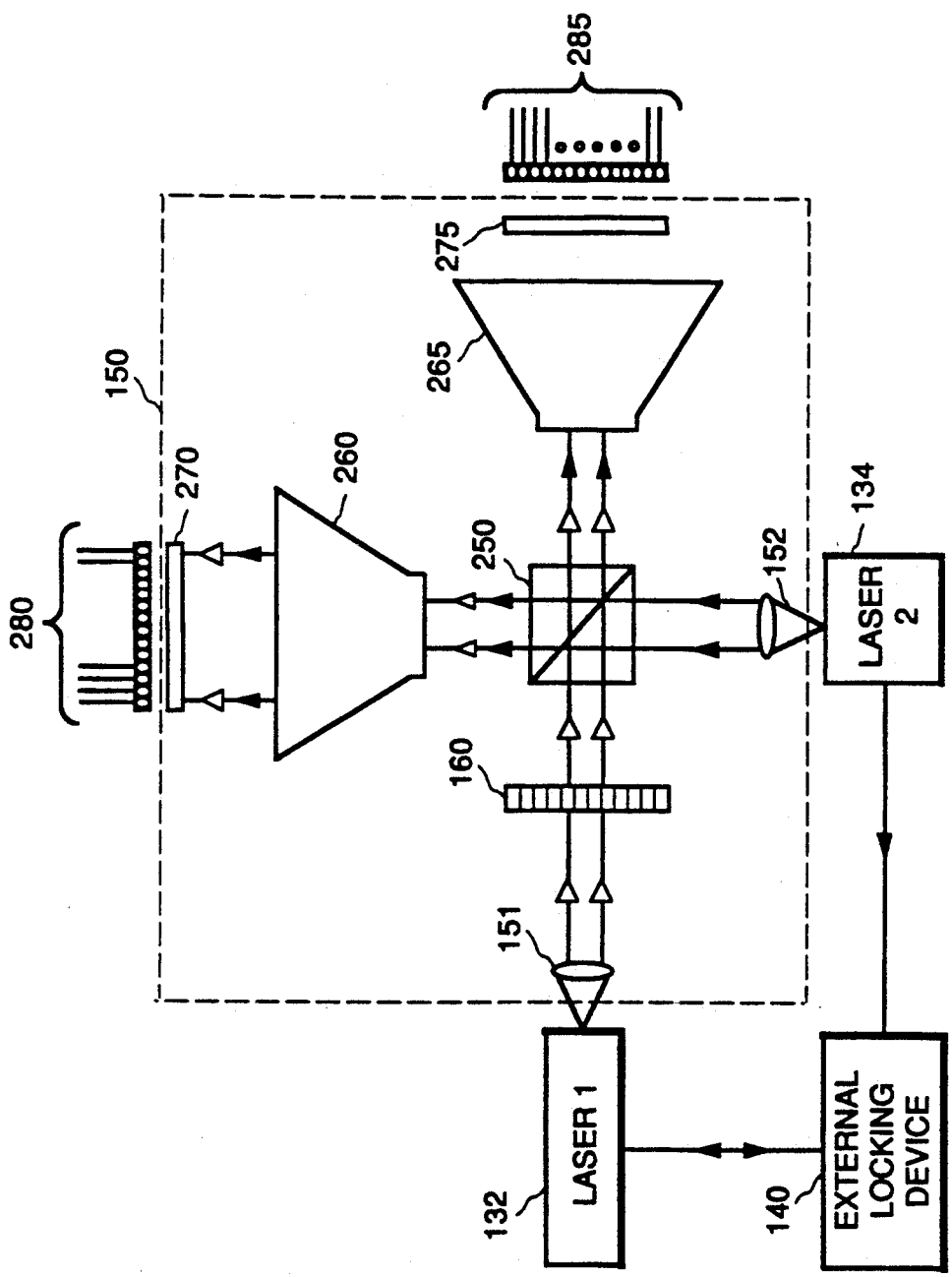
FIG. 4 is a part block and part schematic representation of a phased array antenna system illustrating a second embodiment of the present invention.

An alternative embodiment of beam processing system 150 in accordance with this invention having separate fiber optic array links for transmit and receive signals is illustrated in FIG. 4. In this alternative embodiment, first and second lasers are coupled to beam processing system 120, which comprises first and second collimating lenses 151, 152; SLM 160; a non-polarizing beam splitter (BS) 250; a transmit channel beam expander 260; a transmit channel 45° polarizer 270; a receive channel beam expander 265; and a receive channel 45° polarizer 275.

As shown in FIG. 4, the arrangement of first and second lasers 132, 134, and first and second collimating lenses 151, 152 is as described above with respect to FIG. 2. In the embodiment illustrated in FIG. 4, SLM 160 is disposed to receive light passing from first collimating lens 151 and is optically coupled to BS 250 along a first input axis of the beamsplitter; collimating lens 152 is coupled to BS 250 along a second input axis orthogonal to the first input axis. BS 250 is disposed so that a portion of the first light beams emanating from first laser 132 and through SLM 160 pass undeflected through the beamsplitter, with the remaining portion being deflected by 90° (as BS 250 is a non-polarizing beamsplitter, it splits each beam incident on it regardless of the linear polarization of the beam). Similarly, a portion of the second light beams emanating from second collimating lens pass through BS undeflected, and are thus combined on collinear and respective coincident paths with the portion of the first light beams deflected by 90°, and the remaining portion of the second light beams are deflected by 90° to a path that causes them to be combined on collinear and respective coincident paths with the portion of the first light beams that passed through BS 250 undeflected. As a consequence, two separate channels are generated, each having a combination of respective ones of first and second light beams, and each exhibits the interference resulting from the modulation of the phase of the first light beams as they passed through SLM 160.

Beamsplitter 250 is optically coupled along one output path, e.g., for the transmit signal control beams, to transmit channel beam expander 260, which in turn is optically coupled to transmit channel 45° polarizer 270 and transmit channel fiber optic array link 280. Similarly, BS 250 is optically coupled along the other output path, e.g., for the receive signal control beams, to receive channel beam expander 265, which in turn is optically coupled to receive channel 45° polarizer 275 and receive channel fiber optic array link 285. The component parts in each of the transmit and receive channel function in the same manner in their respective channels as the corresponding components described above with respect to FIG. 2.

Figure 5:
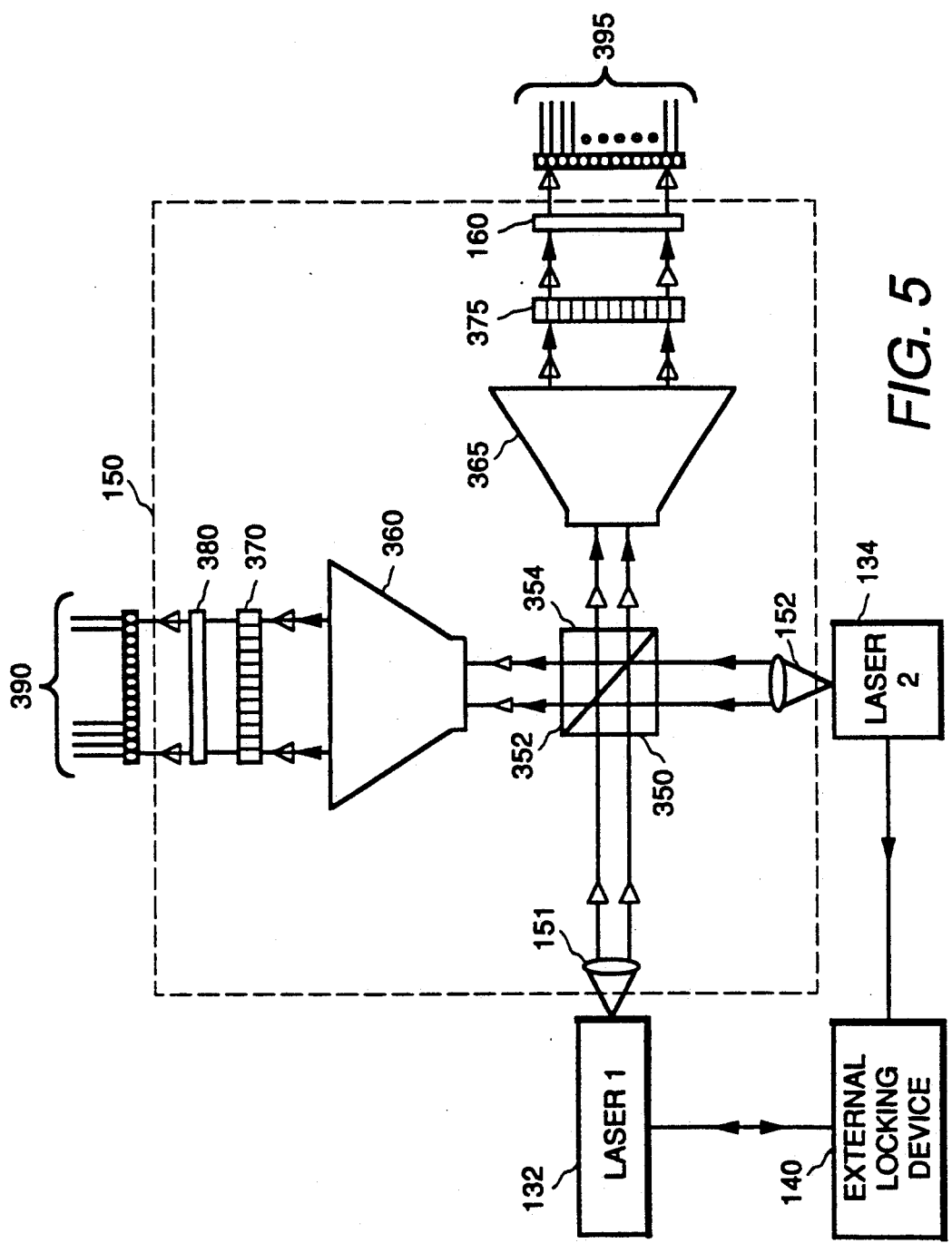
FIG. 5 is a part block and part schematic representation of a phased array antenna system illustrating a third embodiment of the present invention.

A further embodiment of beam processing system 150 in accordance with the present invention which provides two independently-controllable channels, as might be used in a time multiplexed beam scanning system, is illustrated in FIG. 5. The arrangement of first and second lasers 132, 134, and first and second collimating lenses 151, 152 is as described above with respect to FIG. 2. The oppositely polarized pluralities of first and second light beams are incident on a non-polarizing beam splitter (BS) 350 along respective first and second axes. As described above with respect to FIG. 4, BS 350 is disposed so that a portion of the first light beams are deflected by 90° and the remaining portion passes through BS 350 undeflected, and a portion of the second light beams are deflected by 90° and the remaining portion passes through undeflected; consequently combined beams having constituent first and second light beams pass from a first channel output face 352 of BS 350 and also from a second channel output face 354 of BS 350.

Beamsplitter 350 is optically coupled along a first channel output axis to a first channel beam expander 360, which is in turn sequentially coupled to a first channel spatial light modulator 370, a first channel 45° polarizer 380, and a first channel fiber optic array 390. Beamsplitter 350 is similarly optically coupled along a second channel optical output axis to a second channel beam expander 365, which is in turn sequentially coupled to a second channel SLM 375, a second channel 45° polarizer 385, and a second channel fiber optic array 395. The embodiment of the invention as illustrated in FIG. 5 thus provides two channels, each with an independently controllable SLM that enables each channel to operate separately and as described above with respect to the single output channel in the device described in FIG. 2.

The signal processing system 150 of this invention is relatively compact (e.g., about 12 inch in length or less) while still providing control of large (e.g., a 5000 antenna element array) phased array antennas.

It will be readily understood by those skilled in the art that the present invention is not limited to the specific embodiments described and illustrated herein. Many variations, modifications and equivalent arrangements will now be apparent to those skilled in the art, or will be reasonably suggested by the foregoing specification and drawings, without departing from the substance or scope of the invention. Accordingly, it is intended that the invention be limited only by the spirit and scope of the appended claims.

What is claimed is:

1. An optical signal processing system comprising:
   a laser assembly comprising first and second lasers capable of generating respective pluralities of phase-synchronized first and second light beams, and further comprising means for selectively controlling a frequency difference between the respective pluralities of first and second light beams;
   means coupled to said laser assembly for combining along respective collinear paths respective ones of said first and second light beams, each of the combined beams comprising respective ones of said first and second light beams superposed on one another and that are respectively orthogonally linearly polarized;
   at least one optical phase modulation device disposed so that at least one of said pluralities of first and second light beams having a selected linear polarization pass therethrough, said at least one optical phase modulating device comprising selectively controllable means for adjusting the phase of respective ones of the light beams passing therethrough having said selected linear polarization; and
   heterodyne means for detecting optical interference between respective ones of said constituent light beams in respective combined beams.

2. The system of claim 1 wherein said means for selectively controlling the frequency difference between the respective pluralities of first and second light beams comprises an external locking device responsive to frequency differences between said first and second laser, said device further comprising a laser tuning device for adjusting the frequency of one of said lasers.

3. The system of claim 2 wherein said laser tuning device comprises a device selected from the group consisting of thermal tuning devices and piezoelectric tuning devices.

4. The system of claim 2 wherein each of said at least one optical phase modulating device having selectively controllable means for adjusting the phase of respective ones of light beams comprises a spatial light modulator (SLM) having a two-dimensional array of liquid crystal pixels.

5. The system of claim 4 wherein each of the liquid crystals pixels in said SLM is independently controllable.

6. The system of claim 5 wherein each of said liquid crystal pixels comprises parallel rub nematic liquid crystals.

7. The system of claim 6 wherein said first and second lasers are adapted to generate respective pluralities of light beams having mutually orthogonal linear polarizations.

8. The system of claim 5 wherein the means for combining respective ones of light beams from said first and second lasers comprises a polarizing beam splitter (PBS) disposed so that the pluralities of respectively orthogonally polarized first and second light beams are incident on said PBS on respective mutually orthogonal first and second input axes such that respective ones of said first and second orthogonally polarized light beams pass as a corresponding combined light beam from said PBS along substantially collinear and coincident paths.

9. The system of claim 8 wherein said at least one SLM is optically coupled to receive combined light beams passing from said PBS.

10. The system of claim 9 wherein said combining means further comprises an imaging device coupled between said PBS and said SLM.

11. The system of claim 10 wherein the heterodyne detection means comprises an array of photodetectors, each photodetector in said array being disposed to receive the combined light beam passing from a respective one of said pixels in said SLM.

12. The system of claim 11 further comprising:
a 45° polarizer optically coupled to said SLM; and
an optical fiber array coupled to said 45° polarizer and disposed so that each respective combined light beam passing from respective ones of the pixels in said SLM enter a predetermined one of the optical fibers, each of said fibers further being optically coupled to a respective one of said photodetectors.

13. The system of claim 5 wherein the means for combining respective ones of light beams from said first and second lasers comprises a non-polarizing beam splitter (BS) disposed so that the respective light beams emanating from said first and second lasers are incident on said BS on respective, mutually orthogonal first and second input axes such that respective ones of said beams from each of said first and second lasers are superposed in said BS to form respective combined beams and a first portion of the combined beams emerge from said BS along a first output axis and a second portion of the combined beams emerge along a second output axis.

14. The system of claim 13 further comprising first and second collimating lenses optically coupled respectively to said first and second lasers whereby light beams incident on said BS are collimated.

15. The system of claim 14 wherein the heterodyne detection means comprises first and second photodetector arrays coupled to said BS so as to respectively receive the combined beams passing along said first and second output axes.

16. The system of claim 13 wherein said BS is optically coupled to first and second SLMs, said first SLM being disposed to receive combined light beams passing from said BS along said first output axis and said second SLM being disposed to receive combined light beams passing from said BS along said second output axis.

17. The system of claim 16 wherein the heterodyne detection means comprises first and second photodetector arrays coupled respectively to said first and second SLMs to receive respective combined light beams passing therefrom.

18. The system of claim 17 wherein each of said first and second SLMs is adapted to be independently controlled whereby said first SLM processes light signals passing along a first channel and said second SLM processes light signals passing along a second channel.

19. The system of claim 5 in combination with an antenna array coupled to the heterodyne detection means such that electrical signals generated by said heterodyne detection means in correspondence with the interference between respective ones of the combined light beams are coupled to drive said antenna array.

20. A method of processing optical control signals for a phased array antenna system comprising:
generating a first and a second plurality of coherent laser light beams from first and second lasers phase-locked together, said first plurality of light beams having a linear polarization opposite to said second plurality of light beams;
combining the first and second pluralities of light beams on collinear paths to form a plurality of combined light beams, each combined light beam comprising constituent light beams from said first laser and said second laser superposed on each other;
modulating the frequency of at least one of said lasers such that each of the combined light beams exhibit a desired beat frequency;
selectively modulating the phase of one of the constituent light beams having a predetermined polarization;
uniformly polarizing the constituent light beams in at least a portion of the combined light beam pairs;
detecting optical interference by heterodyne means between constituent light beams in said uniformly-polarized light beam pairs and generating corresponding electrical signals; and
driving an antenna assembly with said electrical signals.

21. The method of claim 20 wherein the step of selectively modulating the phase of one of the constituent light beams further comprises the steps of:
passing the plurality of combined light beam pairs through a spatial light modulator (SLM) comprising an array of individually controllable pixels; and
individually controlling respective ones of said pixels so as to selectively shift the optical phase of one constituent light beam in each light beam pair passing through said pixels.

22. The method of claim 21 wherein the step of individually controlling respective ones of said pixels comprises selectively adjusting control voltages applied to respective liquid crystal pixels in said SLM.

23. The method of claim 22 wherein the step of detecting optical interference further comprises the steps of directing said plurality of light beam pairs on an array of photodetectors such that respective light beam pairs having passed through a respective one of said pixels are incident on a corresponding photodetector.

24. The method of claim 23 wherein the step of uniformly polarizing the constituent light beam in light beam pairs further comprises the step of passing the constituent light beams in each beam pair through a 45° polarizer.

25. The method of claim 24 wherein the step of generating a first and second plurality of coherent laser light beams further comprises the step of slave locking the phase of a slave one of said lasers to a master optical signal generated by the other of said lasers, said slave locking including adjusting the phase of the slave laser.

26. The method of claim 25 wherein the step of combining the first and second plurality of light beams along collinear paths further comprises:
directing said first plurality of light beams to be incident on a polarizing beam splitter (PBS) along a first input axis; and
directing said second plurality of light beams to be incident on said PBS along a second input axis, said first and second input axes being mutually orthogonal and said PBS being disposed such that one of said first and second plurality of light beams is deflected by 90° and the other of said first and second plurality of light beams passes undeflected through said PBS whereby said first and second plurality of light beams pass from said PBS along collinear paths.

27. The method of claim 25 wherein the step of combining the first and second plurality of light beams comprises:
   directing said first plurality of light beams to be incident on a non-polarizing beam splitter (BS) along a first input axis; and
   directing said second plurality of light beams to be incident on said BS along a second input axis, said first and second input axes being mutually orthogonal and said BS being disposed such that a portion of each of said first and second pluralities of light beams passes directly through said BS and the remaining respective portions of said first and second pluralities are deflected by 90°, whereby combined beams of said first and second pluralities of light beams pass from said BS along each of said first and second output axes.

28. The method of claim 25 wherein the step of modulating the frequency of at least one of said lasers includes the step of selecting a modulation frequency to cause said photodetector array to generate a signal exhibiting a selected carrier frequency to drive said antenna array.

29. The method of claim 20 further comprising the step of selectively introducing a frequency offset at predetermined times on optical signals generated by one of said lasers such that the frequency of electrical signals generated by said heterodyne means exhibit a selected intermediate frequency.

30. The method of claim 29 wherein the step of selectively introducing a frequency offset comprises:
   directing light beams from one of said laser sources onto an acousto-optic device (AOD);
   driving said AOD at a selected intermediate frequency such that a portion of light beams passing therethrough undergo a doppler shift corresponding to said selected intermediate frequency.

31. The method of claim 30 further comprising the step of optically manipulating light beams deflected in said AOD such that said beams are directed onto a path substantially aligned with the path along which they were travelling prior to being deflected.

32. The method of claim 31 wherein said AOD is selectively actuated during a receive cycle and is not driven during a transmit cycle of said phased array antenna system.

33. A phased array antenna system comprising:
   an optical signal processing system comprising:
   a laser assembly having a first and a second laser adapted to generate respective pluralities of phase-synchronized first and second light beams, and further comprising means for selectively controlling a frequency difference between the respective pluralities of first and second light beams;
   a frequency shift unit coupled to at least one said first and second lasers;
   a beam processing system coupled to said laser assembly and said frequency shift unit, said beam processing system comprising an optical phase modulation device disposed so that at least one of said pluralities of first and second light beams having a selected linear polarization pass therethrough, said optical phase modulating device comprising selectively controllable means for adjusting the phase of respective ones of the light beams passing therethrough having said selected linear polarization; and
   a transceiver module comprising heterodyne means for detecting optical interference between respective ones of said constituent light beams in respective combined beams; and
   an antenna array coupled to said beam processing system and responsive to signals generated by said transceiver module.

34. The system of claim 33 wherein said beam processing further comprises means for combining along respective collinear paths respective ones of said first and second light beams, each of the combined beams comprising respective ones of said first and second light beams superposed on one another and that are respectively orthogonally linearly polarized.

35. The system of claim 34 wherein said frequency shift unit comprises:
   an acousto-optic device (AOD) adapted to be selectively driven at a selected offset frequency and disposed to receive light beams passing from the respective laser to which said frequency shift unit is coupled; and
   means for directing light beams deflected in said AOD onto a path such that the beams pass into said beam processing system.

36. The system of claim 35 wherein said means for directing light beams deflected in said AOD comprises a polarizing beam splitter (PBS) and a mirror disposed to receive light beams deflected in said AOD and direct the light deflected in said AOD into said PBS along a path such that the light beams are deflected onto a path towards said beam processing system.

37. The system of claim 36 wherein said means for directing light beams further comprises a plurality of polarization rotation switches (PRSs), at least one of said PRSs being disposed such that light beams entering said frequency shift unit pass therethrough prior to being incident on said PBS and at least one of said PRSs being coupled such that light beams exiting said PBS pass therethrough prior to entering said beam processing system.

38. The system of claim 37 wherein said PBS comprises a cube polarizing beam splitter or a Thompson polarizing beam splitter.

39. The system of claim 37 wherein said optical phase modulating device comprises a spatial light modulator (SLM) having a two-dimensional array of liquid crystal pixels.

40. The system of claim 39 wherein each of the liquid crystals pixels in said SLM is independently controllable.

* * * * *